US006914120B2

(12) United States Patent
Germroth et al.

(10) Patent No.: US 6,914,120 B2
(45) Date of Patent: Jul. 5, 2005

(54) METHOD FOR MAKING ISOSORBIDE CONTAINING POLYESTERS

(75) Inventors: Ted Calvin Germroth, Kingsport, TN (US); Sam Richard Turner, Kingsport, TN (US); Lanny Calvin Treece, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 167 days.

(21) Appl. No.: 10/293,605

(22) Filed: Nov. 13, 2002

(65) Prior Publication Data

US 2004/0092703 A1 May 13, 2004

(51) Int. Cl.[7] ............................................. C08G 63/66
(52) U.S. Cl. ...................... 528/300; 528/302; 528/307; 528/308; 528/308.6; 528/403
(58) Field of Search ................. 528/300, 302, 528/307, 308, 308.6, 403

(56) References Cited

U.S. PATENT DOCUMENTS

| | | | |
|---|---|---|---|
| 2,465,319 A | 3/1949 | Whinfield et al. | |
| 2,901,466 A | 8/1959 | Kibler et al. | |
| 3,032,822 A | 5/1962 | Maddock | |
| 3,033,826 A | 5/1962 | Kibler et al. | |
| 3,047,539 A | 7/1962 | Pengilly | |
| 3,223,752 A | 12/1965 | Tate et al. | |
| 4,025,492 A | 5/1977 | Binsack et al. | |
| 4,136,089 A | 1/1979 | Bier et al. | |
| 4,176,224 A | 11/1979 | Bier et al. | |
| 4,196,186 A | 4/1980 | Bogoch | |
| 4,208,527 A | 6/1980 | Horlbeck et al. | |
| 4,238,593 A | 12/1980 | Duh | |
| 4,521,556 A | 6/1985 | Adams | |
| 4,554,343 A | 11/1985 | Jackson, Jr. et al. | |
| 4,578,453 A | 3/1986 | Jackson, Jr. et al. | |
| 4,740,581 A | 4/1988 | Pruett et al. | |
| 4,749,772 A | 6/1988 | Weaver et al. | |
| 4,749,773 A | 6/1988 | Weaver et al. | |
| 4,749,774 A | 6/1988 | Weaver et al. | |
| 4,950,732 A | 8/1990 | Weaver et al. | |
| 4,959,450 A | 9/1990 | Morris et al. | |
| 5,106,941 A | 4/1992 | Jenkins et al. | |
| 5,106,944 A | 4/1992 | Sublett | |
| 5,194,573 A | 3/1993 | Schmidt et al. | |
| 5,198,530 A | 3/1993 | Kyber et al. | |
| 5,296,586 A | 3/1994 | Burch et al. | |
| 5,340,910 A | 8/1994 | Chamberlin et al. | |
| 5,372,864 A | 12/1994 | Weaver et al. | |
| 5,376,735 A | 12/1994 | Sublett | |
| 5,384,377 A | 1/1995 | Weaver et al. | |
| 5,464,590 A | 11/1995 | Yount et al. | |
| 5,608,031 A | 3/1997 | Yau et al. | |
| 5,681,918 A | 10/1997 | Adams et al. | |
| 5,958,581 A * | 9/1999 | Khanarian et al. | 428/357 |
| 5,959,066 A * | 9/1999 | Charbonneau et al. | 528/271 |
| 6,025,061 A * | 2/2000 | Khanarian et al. | 428/221 |
| 6,063,464 A * | 5/2000 | Charbonneau et al. | 428/36.92 |
| 6,063,465 A * | 5/2000 | Charbonneau et al. | 428/36.92 |
| 6,063,495 A * | 5/2000 | Charbonneau et al. | 428/364 |
| 6,126,992 A * | 10/2000 | Khanarian et al. | 427/162 |
| 6,140,122 A | 10/2000 | Romet-Lemonne et al. | |
| 6,140,422 A * | 10/2000 | Khanarian et al. | 525/176 |
| 6,359,070 B1 * | 3/2002 | Khanarian et al. | 525/173 |
| 6,368,710 B1 * | 4/2002 | Hayes | 428/364 |
| 6,407,266 B2 | 6/2002 | Bhatia | |
| 6,429,278 B1 | 8/2002 | Howell, Jr. et al. | |
| 6,485,819 B2 * | 11/2002 | Hayes | 428/221 |
| 6,656,577 B1 * | 12/2003 | Adelman et al. | 428/221 |

FOREIGN PATENT DOCUMENTS

| | | |
|---|---|---|
| EP | 0 434 925 A2 | 7/1991 |
| EP | 0 826 713 A1 | 3/1998 |
| WO | WO 98/45350 A1 | 10/1998 |
| WO | WO 99/54399 A1 | 10/1999 |

OTHER PUBLICATIONS

Wilfong, R.E., "Linear Polyesters", Journal of Polymer Science, (1961), pp. 385–410, vol. 54.

* cited by examiner

*Primary Examiner*—Samuel A. Acquah
(74) *Attorney, Agent, or Firm*—B. J. Boshears; Bernard J. Graves, Jr.

(57) ABSTRACT

This invention relates to a process for producing a polyester comprising the steps of:

(g) obtaining an aqueous homogenous solution of isosorbide;

(h) feeding the aqueous homogenous solution of step (a) into a reactor;

(i) feeding one or more glycols and one or more dicarboxylic acids either into the aqueous solution of step (a) or into the reactor of step (b) either prior to, during and/or subsequent to step (b);

(j) esterifying the reactor contents at sufficient temperatures and pressures, and optionally in the presence of suitable catalysts, to effect esterification;

(k) forming a prepolymer; and (l) polycondensing the prepolymer at sufficient temperatures and pressures in the presence of a suitable catalyst to effect polycondensation to form a polyester.

39 Claims, No Drawings

METHOD FOR MAKING ISOSORBIDE CONTAINING POLYESTERS

FIELD OF THE INVENTION

This invention relates to a method of making polyesters containing an isosorbide moiety. More particularly, this invention relates to such methods where the isosorbide is dissolved in water prior to being fed to the reactor where the polymerization of the polyester occurs.

BACKGROUND OF THE INVENTION

Polyesters are widely used as extrusion and injection molding resins for application such as fibers, films, sheeting, automotive parts, and food and beverage containers. In manufacturing polyesters, handling issues arise with respect to supplying these monomers to the reactor since glycols and dicarboxylic acids are many times solid at ambient conditions.

Conventional monomer feeds to polyester processes are slurries, melts or direct solid feeds.

Isosorbide is generally known in the art as a monomer for incorporation into certain types of polyesters. Isosorbide is a diol that can act as a partial substitute for other diols including ethylene glycol and 1,4-cyclohexanedimethanol. It may be incorporated as a monomer into polyesters that include terephthaloyl moieties. Isosorbide improves the thermal properties of certain polyesters by giving the polymer a higher glass transition temperature. This monomer may also enhance the polymer's performance in a variety of applications where conventional polyesters cannot perform the same functions. These properties provide value to markets such as PET rigid containers and thermoplastics as well as others.

Copolymers containing isosorbide moieties, ethylene glycol moieties, and terephthaloyl moieties have been previously disclosed but in limited instances. A copolymer containing these three moieties, in which the mole ratio of ethylene glycol to isosorbide was about 90:10, was reported in the published German Patent Application No. 1,263,981 (1968). The polymer was used as a minor component (about 10%) of a blend with polypropylene to improve the dyeability of polypropylene fiber. It was made by melt polymerization of dimethyl terephthalate, ethylene glycol, and isosorbide, but the process conditions were described only in general terms in the publication.

U.S. Pat. No. 6,063,464 describes a polymerization process for isosorbide containing polyesters where the diols (including isosorbide) are mixed with the dimethyl ester of the diacid in the presence of an ester interchange catalyst which causes exchange of the diol for the methyl group of the dimethyl esters through a transesterification reaction. The catalyst may be included initially with the reactants and/or may be added one or more times to the mixture as it is heated. This patent also teaches that some of the monomers may need to be included in excess at the beginning of the polymerization reaction and removed by distillation as the reaction proceeds.

Published PCT Application WO 99/54119 describes a polyester polymer and method for making the polyester, wherein the polyester is prepared by (1) combining in a reactor a monomer containing a diacid moiety; a monomer comprising a diol moiety; and a monomer containing an isosorbide moiety; with a condensation catalyst suitable for condensing aromatic diacids and diols; and (2) heating the monomers and catalyst to polymerize the monomers to yield a polyester having an inherent viscosity of at least about 0.15 dL/g. This publication describes the mixing of monomers comprising the polyester (including isosorbide) in the beginning of the process.

The market for isosorbide containing polyesters requires good resin quality which is dependent on the product of high purity material and resin that is prepared by an efficient, economical, continuous process. With respect to the efficient, economical process, it is important to provide a process, which integrates readily into conventional melt phase polyester manufacturing equipment. This requires a practical way of conveying and storing the isosorbide monomer from its manufacturing location to the polyester process where it is used.

BRIEF SUMMARY OF THE INVENTION

In a process for producing a polyester containing isosorbide as part of its glycol components, the isosorbide is dissolved in water to provide an aqueous homogenous solution of isosorbide. By "homogenous", it is meant that the isosorbide is completely dissolved in the water. The aqueous solution is fed into a reactor. Other diols and dicarboxylic acids are either added to the aqueous solution of isosorbide and then are fed to the reactor or are added to the reactor separately. The reactor contents are esterified at sufficient temperatures and pressures, and optionally in the presence of a suitable catalyst, to effect esterification. A prepolymer is formed. The prepolymer is then polycondensed at sufficient temperatures and pressures in the presence of a suitable catalyst to effect polycondensation to form a polyester.

This invention provides the advantage of easier handling of the isosorbide as opposed to the feeding of the isosorbide into the reactor as a slurry or a solid. Slurries are generally hard to pump and maintain consistent concentration of monomer(s) in the feed. Solid isosorbide is very hydroscopic. This presents challenges in feeding constant concentrations also. Liquid solutions can be stored, conveyed, metered, and kept homogenous and contamination free much more readily than solids or slurries. The equipment cost for storage, conveying, metering, and handling an isosorbide solution is consequently reduced considerably over that required for handling isosorbide as a slurry or solid.

Additional advantages of the invention include the process of the invention's low impact on the polyester process. Isosorbide can be stored as a liquid and readily pumped to the esterification portion of the polyester process. Typically, the dicarboxylic acid monomers are frequently solids and are either dissolved in the liquid glycol monomers or fed to the esterification portion of the process as a slurry using the liquid glycol monomers as the carrier. In the preparation of polymers containing isosorbide, the aqueous solution of isosorbide can readily serve as a carrier in addition to any other liquid glycol monomers. During esterification, water is generated as a by-product of reaction and must be removed from the process. Water, co-fed with the isosorbide, can be easily removed.

Therefore, this invention provides several advantages over the art including, but not limited to: (1) a practical way to convey and store monomer from its manufacturing location to the polyester process where it is used, (2) a solvent for either dissolving the isosorbide, and/or other water-soluble monomers, and/or (3) a carrier for a slurry for non-water soluble monomers.

DETAILED DESCRIPTION OF THE INVENTION

This invention relates to a process for producing a polyester comprising the steps of:
- (a) obtaining an aqueous homogenous solution of isosorbide;
- (b) feeding the aqueous homogenous solution of step (a) into a reactor;
- (c) feeding one or more glycols (which may or may not include isosorbide) and one or more dicarboxylic acids either into the aqueous solution of step (a) or into the reactor of step (b) either prior to, during and/or subsequent to step (b);
- (d) esterifying the reactor contents at sufficient temperatures and pressures, and optionally in the presence of suitable catalysts, to effect esterification;
- (e) forming a prepolymer; and
- (f) polycondensing the prepolymer at sufficient temperatures and pressures in the presence of a suitable catalyst to effect polycondensation to form a polyester.

The isosorbide monomer useful in this invention is the diol, 1,4:3, 6-dianhydro-D-sorbitol. The structure of the isosorbide monomer is illustrated below. It is produced from renewable sources, such as sugars and starches. For example, isosorbide results from the dehydration reaction of sorbitol, which is directly derived from glucose. Glucose is obtained by enzymatic hydrolysis of starch extracted from corn. Isosorbide is a diol produced from yearly renewable materials. Isosorbide has the following structure:

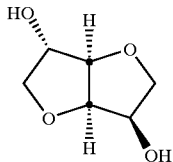

In step (a) of the invention, the aqueous homogenous solution of isosorbide can be obtained by mixing the isosorbide with water at from about 1 to about 99% by weight, preferably 60 to 95% by weight, more preferably, 70 to 90% by weight, and even more preferably, 70 to 85% by weight of isosorbide in water where the total weight of the water and isosorbide equals 100% by weight. The aqueous homogeneous solution of isosorbide can also be commercially obtained. Mechanical mixing of the isosorbide with the water is not required. However, the isosorbide can be mechanically mixed with the water in order to more rapidly dissolve it by any conventional mixing means known in the art. A preferred method is to dissolve the isosorbide at ambient conditions. Another preferred method is where complete drying is avoided during preparation and isolation. Since isosorbide is generally produced in aqueous systems, aqueous solution isosorbide can be used directly in this invention.

As shown in steps (b) and (c), the aqueous isosorbide solution in step (a) is fed into a reactor either (1) without any other monomer and/or additive present in the solution, or (2) where water-soluble additives and/or water-soluble monomers (may or may not include isosorbide) are dissolved in the aqueous isosorbide solution, or (3) where non-water soluble monomers and/or non-water soluble additives may or may not be slurried into the aqueous isosorbide solution prior to being fed into the reactor. However, the isosorbide is preferably dissolved in the water prior to the addition of any other monomer or additive. By "water soluble", it is meant that a single-phase liquid is formed at the concentration specified. By "non-water soluble", it is meant that a single-phase liquid is not formed at the concentration specified.

It is particularly surprising that when other monomers such as 1,4-cyclohexanedimethanol and/or ethylene glycol are added to the aqueous isosorbide solution, the isosorbide is not precipitated out of solution. Also, aqueous isosorbide solution provides good solution stability such as resistance to freezing, crystallization and processable viscosities (pumpability and flowability). It is optional in this invention to store the aqueous isosorbide solution prior to adding other monomers or polyester additives or after the addition of certain monomers such as ethylene glycol and prior to feeding it to the reactor. It is preferable that the storage conditions for the aqueous isosorbide solution are ambient conditions. The reaction conditions for feeding the aqueous isosorbide solution into the reactor can be at ambient conditions or higher temperatures.

Polyesters generally comprise at least one dicarboxylic acid and at least one glycol. Monomers other than isosorbides are used in conjunction with isosorbide in the preparation of the polyesters of the invention. These monomers include generally at least one glycol other than isosorbide and at least one dicarboxylic acid. Glycols useful in the present invention other than isosorbide include cycloaliphatic diols preferably having 6 to 20 carbon atoms or aliphatic diols preferably having 2 to 20 carbon atoms, more preferably having 2 to 12 carbon atoms. Examples of such diols include, but are not limited to, ethylene glycol, 1,3-propanediol, 1,4-butanediol; 1,5-pentanediol; 1,6-hexanediol; 3-methylpentanediol-(2,4-), 2-methylpentanediol-(1,4-), 2,2,4-trimethylpentanediol-(1,3-), 2-ethylhexanediol-(1,3-), 2,2-diethylpropanediol(1,3-), 1,3-hexanediol, 1,4-di(hydroxyethoxy)-benzene, 2,2-bis-(4-hydroxycyclohexyl)-propane, 2,2-bis-(3-hydroxyethoxyphenyl)-propane diol, neopentyl glycol; diethylene glycol; 1,8-octanediol; 1,10-decanediol; cis or trans-1,4-cyclohexanedimethanol and mixtures of cis and trans monomers; 2,2,4,4-tetramethyl-1,3-cyclobutanediol, triethylene glycol, 2,2-bis[4-(2-hydroxyethoxy)phenyl] propane; 1,1-bis[4-(2-hydroxyethoxy)-phenyl]cyclohexane; 9,9-bis[4-(2-hydroxyethoxy)phenyl]fluorene; 1,4:3,6-dianhydromannitol; 1,4:3,6-dianhydroiditol and 1,4-anhydroerythritol. Preferred diol moieties other than isosorbide are derived from ethylene glycol, 1,4-butanediol, 1,3-propanediol, neopentyl glycol, and 1,4-cyclohexanedimethanol. The most preferred glycols other than isosorbide are ethylene glycol and 1,4-cyclohexanedimethanol. Small amounts of alcohols with functionality greater than 2 may also be utilized, e.g., trimethylopropane and pentaerythritol. Any combination of these glycols with isosorbide may be used. It is preferred that the glycol component of the polyester of the invention comprise 50 to 99.75 mole % of one or more of these glycols (other than isosorbide). In the glycol component of the polyester useful in this invention, the mole percentages of the glycols referred to herein equal a total of 100 mole %.

Useful dicarboxylic acids of the invention include, but are not limited to, aromatic dicarboxylic acids preferably having from 6 to 40 carbon atoms, more preferably, 8 to 14 carbon atoms; aliphatic dicarboxylic acids having, preferably, 2 to 40 carbon atoms, more preferably 4 to 12 carbon atoms; or cycloaliphatic dicarboxylic acids having 5 to 40 carbon atoms, more preferably 8 to 12 carbon atoms. Examples of dicarboxylic acids useful in this invention include, but are not limited to, terephthalic acid, isophthalic acid, 1,4-naphthlenedicarboxylic acid, 2,6-naphthalenedicarboxylic acid, 2,7-naphthalenedicarboxylic acid, 1,4-cyclohexanedicarboxylic acid, cyclohexanediacetic acid, 5-sodiosulfoisophthalic acid, adipic acid, azelaic acid, glutaric acid, maleic acid, malonic acid, dimethylmalonic acid, allylmalonic acid, oxalic acid, sebacic acid, succinic acid, carbonic acid, sulfoisophthalic acid, 2,5-furandicarboxylic acid, 2,5-thiophenedicarboxylic acid, 3,4'- and 4,4'-diphenyl sulfide dicarboxylic acid, diphenyl-4,4'-dicarboxylic acid, naphthalenedicarboxylate, 3,4'- and 4,4'-diphenylsulfone dicarboxylic acid, 3,4'- and 4,4'-benzophenonedicarboxylic acid, 4,4'-methylene bis(cyclohexyl)dicarboxylic acid, trans-1,4-cyclohexanedicarboxylic acid, cis-1,4-cyclohexanedicarboxylic acid, cis- and/or trans-1,3-cyclohexanedicarboxylic acid, 4-cyclohexane-1,2-dicarboxylic acid, 2-ethylsuberic acid, 1,2-bis(4-carboxyphenoxy)ethane, 4,4'-methylene-bis(benzoic) acid, 4,4'-methylene-bis(cyclohexyl) carboxylic acid, 3,4-furandicarboxylic acid, 1,1-cyclobutane dicarboxylic acid, p-carboxyphenyl/oxybenzoic acid, ethylene(p-oxybenzoic acid), trans-4,4'-stilbenedicarboxylic acid, 2,2,3,3-tetramethylsuccinic acid, cyclopentanedicarboxylic acid, decahydro-1,5-naphthylene dicarboxylic acid, decahydro-2,6-naphthylene dicarboxylic acid, 4,4-bicyclohexyl dicarboxylic acid, fumaric acid, dimer acid, resorcinoldiacetic acid, and 4,4'-bibenzoic acid and the like.

Of these, terephthalic acid, isophthalic acid, naphthalenedicarboxylic acid, and cyclohexanedicarboxylic acid are preferred. More preferred acids are terephthalic acid, isophthalic acid, and naphthalenedicarboxylic acid. Even more preferred acids are terephthalic acid and isophthalic acid, either used singly or in combination.

When cyclohexanedicarboxylic acid is used in the context of this invention, cis-, trans-, or cis/trans mixtures may be used. Any of the naphthalenedicarboxylic acid isomers or mixtures of isomers may be used. Some preferred naphthalenedicarboxylic acid isomers include 2,6-, 2,7-, 1,4-, and 1,5-isomers.

Small amounts of trifunctional acids may also be employed, e.g., 1,3,5-benzenetricarboxylic acid. Further, by "aromatic" and "alicyclic", it is meant to include substituted aromatic or alicyclic compounds, e.g., aromatic compounds substituted with an aliphatic group.

Copolyesters may be prepared from one or more of the above dicarboxylic acids.

It should be understood that "dicarboxylic acids" includes the corresponding acid anhydrides, esters, and acid chlorides of these acids. In the acid component of the polyester useful in the invention, the mole percentages of the acids referred to herein equal a total of 100 mole %.

For commercial reasons, the following polyesters are preferred embodiments of the invention:

Polyesters comprising terephthalic acid and/or isophthalic acid and ethylene glycol and/or 1,4-cyclohexanedimethanol with isosorbide moieties are preferred.

The acid component of the copolyester of the invention may contain from about 10 to about 100 mole % of any of the dicarboxylic acids described herein. However the polyester of the invention preferably comprises one or more dicarboxylic acids comprising at least 50 mole %, preferably 60 mole % to 100 mole %, more preferably 80 to 100 mole % and even more preferably from 90 to 100 mole % terephthalic acid. By terephthalic acid, suitable synthetic equivalents, such as dimethyl terephthlate, are included.

When isophthalic acid is present as the dicarboxylic acid, the isophthalic acid is preferably present in the amount of 0.1 to 50 mole %.

It is also preferable when the acid component of the copolyester comprises naphthalenedicarboxylic acid, it is present in the amount of 0.1 to 50 mole %. When terephthalic acid and naphthalenedicarboxylic acid are both present in the polyester, it is preferable that the naphthalenedicarboxylic acid is present in the amount of 0.1 to 50 mole % and that the terephthalic acid is present in the amount of 50 to 99.9 mole %.

The polyesters of the invention preferably comprise isosorbide moieties in amounts in the range of about 0.01 to about 50 mole %, preferably about 0.25 to about 30 mole %, and even more preferably, about 10 to about 30 mole %, and yet even more preferably, about 20 to about 30 % mole. Depending on the application, isosorbide may be present in other desirable ranges such as 1 mole % to 3 mole %, 1 mole % to 6 mole %, 1 mole % to 8 mole % and 1 mole % to 20 mole %.

One preferred embodiment includes polyesters wherein the diacid component comprises 80 to 100 mole %, more preferably, 90 to 100 mole %, and even more preferably, 95 to 100 mole % terephthalic acid; and the diol component comprises 60 to 99.75 mole %, more preferably 80 to 98 mole, more preferably, 90 to 98 mole % ethylene glycol. In this preferred embodiment, isosorbide comprises from 0.01 to 50 mole %, preferably 0.25 to 40 mole %, more preferably, 2 to 20 mole %, and even more preferably, 2 to 10 mole % of the glycol of this polyester. In this embodiment, it is preferred but not required that 1,4-cyclohexanedimethanol comprises the remainder of the glycol component of the polyester. It is also preferred that 1,4-cyclohexanedimethanol comprises from 0 to 10 mole % of the glycol component of the polyester. Alternatively, it is also preferred that isophthalic acid comprises from 0 to 10 mole % of the diacid component of the polyester.

A second preferred embodiment includes polyesters wherein the diol component comprises 50 to 99.75 mole %, preferably 20 to 50 mole %, and even more preferably, 30 to 50 mole % 1,4-cyclohexanedimethanol. Isosorbide comprises from 0.25% to 50 mole %, preferably, 1 to 40 mole %, and more preferably, 5 to 30 mole % of the glycol content of this polyester. In this embodiment, it is preferred but not required that the remainder of the glycol component is ethylene glycol. In this embodiment, is also preferred but not required that the diacid component of the polyester comprise 80 to 100 mole %, more preferably, 90–100 mole %, and even more preferably 95 to 100 mole percent of terephthalic acid. Isophthalic acid may also be included in the diacid component of this invention.

Yet another preferred embodiment includes polyesters wherein the glycol component comprises 50 to 99.75 mole percent, more preferably, 55 to 95 mole %, even more preferably, 60 to 90 mole percent 1,4-cyclohexanedimethanol, and yet even more preferably, 60 to 70 mole % 1,4-cyclohexanedimethanol. Isosorbide comprises from 0.25% to 50 mole %, preferably, 5 to 30 mole %, more preferably, 10 to 20 mole % of the glycol component of this polyester. In this embodiment, it is preferred but not required that the remainder of the glycol component is ethylene glycol. In this embodiment, is also preferred but not required that the diacid component of the polyester comprise 80 to 100 mole %, more preferably, 90 to 100 mole %, and even more preferably 95 to 100 mole percent of terephthalic acid. A preferred additional diacid is isophthalic acid.

The monomer composition of the polymer is chosen for specific uses and for specific sets of properties. For uses where a partially crystalline polymer is desired, as for example food and beverage containers, such as hot fill or cold fill bottles, fibers, and films, the polymer will generally have a monomer composition in the range of about 0.01% to about 50%, preferably about 2% to about 20% on a molar basis of isosorbide moieties.

For applications where it is desirable to have an amorphous polymer, such as would be used to make transparent optical articles, the amount of isosorbide moiety is in the range of about 0.25% to about 50%, preferably about 5% to about 30% on a molar basis.

The polyester formed by the process of this invention may have an inherent viscosity, which is an indicator of molecular weight, of at least about 0.15 dL/g, more desirably at least about 0.35 dL/g, as measured on a 1% (weight/volume) solution of the polymer in o-chlorophenol at a temperature of 25° C. These inherent viscosities are sufficient for some applications such as optical articles and coatings. For applications such as compact discs, an inherent viscosity of about 0.4 dL/g is preferred. Higher inherent viscosities such as 0.5 dL/g are desirable for many other applications (e.g. bottles, films, sheet, molding resin). The conditions can be adjusted to obtain desired inherent viscosities up to at least 0.1, preferably, 0.1 to 1.5 dL/g, and even more preferably, 0.4 to 0.9 dL/g as determined in a 60/40 (wt./wt.) phenol/tetrachloroethane at a concentration of 0.5 g/100 ml as determined at 25° C. Further processing of the polyester may achieve inherent viscosities of 0.7, 0.8, 0.9, 1.0, 1.5, 2.0 dL/g and even higher.

Methods for their preparation are described, for example, in U.S. Pat. Nos. 2,465,319 and 3,047,539. However, the polyesters of the invention can be made by any of several methods known in the art.

The polymers can also be made by a melt polymerization process which is known in the art, including that in which the acid component is either terephthalic acid or dimethyl terephthlate, and also may include the free acid or dimethyl ester of any other diacids that may be desired in the polyester polymer composition. The diacids or dimethyl esters are heated with the diols (ethylene glycol, isosorbide, optional diols) in the presence of a catalyst to a high enough temperature that the monomers combine to form esters and diesters, then oligomers, and finally polymers. The polymeric product at the end of the polymerization process is a molten polymer. The diol monomers (e.g., ethylene glycol and isosorbide) are volatile and distill in part from the reactor as the polymerization proceeds.

The polymerization reaction may be carried out in the presence of one or more conventional polymerization catalysts. Typical catalysts or catalyst systems for polyester condensation are well known in the art. Suitable catalysts are disclosed, for example, in U.S. Pat. Nos. 4,025,492, 4,136,089, 4,176,224, 4,238,593, and 4,208,527, the disclosures of which are herein incorporated by reference. Further, R. E. Wilfong, Journal of Polymer Science, 54, 385, (1961) describes typical catalysts, which are useful in polyester condensation reactions. Preferred catalyst systems include Ti, Ti/P, Mn/Ti/Co/P, Mn/Ti/P, Zn/Ti/Co/P, Zn/Al, and Li/Al. When cobalt is not used in the polycondensation, copolymerizable toners may be incorporated into the copolyesters to control the color of these copolyesters so that they are suitable for the intended applications where color may be an important property. In addition to the catalysts and toners, other conventional additives, such as antioxidants, dyes, etc., may be used in the copolyesterifications in typical amounts.

Examples of such additives include pigments, colorants, stabilizers, antioxidants, extrusion aids, slip agents, carbon black, flame retardants and mixtures thereof.

One or more branching agents may also be useful in making the polyesters formed within the context of the invention. The branching agent can be one which provides branching in the acid unit portion of the polyester, or in the glycol unit portion, or it can be a hybrid. Some of these branching agents have already been described herein. However, illustrative of such branching agents are polyfunctional acids, polyfunctional glycols and acid/glycol hybrids. Examples include tri or tetracarboxylic acids, such as trimesic acid, pyromellitic acid and lower alkyl esters thereof and the like, and tetrols such as pentaerythritol. Also triols such as trimethylopropane or dihydroxy carboxylic acids and hydroxydicarboxylic acids and derivatives, such as dimethyl hydroxy terephthalate, and the like are useful within the context of this invention.

This invention can be further illustrated by the following examples of preferred embodiments thereof, although it will be understood that these examples are included merely for purposes of illustration and are not intended to limit the scope of the invention unless otherwise specifically indicated. The starting materials are commercially available unless otherwise indicated.

EXAMPLES

Example 1

Example of the Invention

Isosorbide (219.21 g) was mixed with 38.68 g of water until dissolved (85 weight % isosorbide in water where the weight percentages of the water and isosorbide equaled a total of 100 weight %). To this solution was added a slurry of 830.5 g Amoco TA-22 TPA, 504.6 g CHDM-D (melted, ~50*C.) sold commercially by Eastman Chemical Company, Kingsport, Tenn. (Eastman), and 31.4 g ethylene glycol. This combined slurry was pulled into a Parr pressure reactor using vacuum. The Parr reactor was sealed, pressurized to 20 psig and heated over ~1 hour to 275° C. and held at these conditions for 4 hours and 50 minutes with removal of water via an attached fractionation column followed by a condensor. The pressure was reduced to 10 psig over 35 minutes before depressuring the Parr pressure reactor and discharging the reaction products, polyester oligomer. The polyester oligomer was off white but clear with no signs of undissolved TPA. The polyester oligomer was converted to polymer via conventional polymerization techniques.

Example 2

Example of the Invention

To a 500 ml round-bottom flask equipped with a ground glass head, a stirrer, and a nitrogen inlet was added 97.0 grams (0.50 moles) of dimethyl terephthalate, 33.2 grams (0.5357 moles) of ethylene glycol, 23.7 grams (0.1643 moles) of 1,4-cyclohexanedimethanol, 50.6 grams (0.35 moles) of isosorbide from an isosorbide/water solution that was 83.5% isosorbide (60.6 grams), 16 parts per million (ppm) of titanium catalyst in a butanol solution, and 46 ppm manganese catalyst in an ethylene glycol solution. The flask was purged 3 times to 100 mm vacuum alternating with a nitrogen purge to atmosphere. The flask was immersed in a Belmont metal bath and heated for 2 hours at 200° C. with a stirring rate of 200 rpm. The temperature was raised to 210° C. and these conditions held for an additional 2 hours. After this time, the theoretical amount of methanol had been collected. 60 ppm of phosphorus catalyst in an ethylene glycol/butanol solution was added and the temperature increased to 280° C. The pressure in the flask was reduced from atmospheric to between 0.1 and 0.5 mm of Hg over 5 minutes. The temperature was maintained at 280° C. and the pressure between 0.1 and 0.5 mm for 60 minutes. Stirring was reduced as viscosity increased until a minimum stir rate of 15 RPM was obtained. The vacuum was discontinued and nitrogen bled into the flask. The polymer was allowed to cool, removed from the flask and ground to pass a 3-mm screen. Analytical results: I.V.=0.54 dL/g; 52.6 mole percent ethylene glycol; 32.2 mole percent 1,4-cyclohexanedimethanol; 14.6 mole percent isosorbide; 0.60 mole percent diethylene glycol; GPC Mw=29400, L* color value=82.97, a* color value=−1.15, b* color value=11.88; $2^{nd}$ cycle glass transition temperature=97.0° C.

Example 3

Comparative Example (Compares to Example 1 Herein)

Isosorbide (219.21 g) was added to 830.5 g Amoco TA-22 TPA, and 31.0 g ethylene glycol in a 2 L metal beaker before adding 533.57 g melted (~50*C) CHDM-D sold commercially by Eastman Chemical Company, Kingsport, Tenn. (Eastman). This mixture was very thick and paste like and would not flow sufficiently to be added to the Paar reactor without further heating and stirring. The combined paste is heated to over 180*C. to achieve a slurry sufficiently thin that it could be pulled into the Paar reactor with vacuum via a tubing and valve set up. The Parr reactor was sealed, pressurized to 22 psig and heated over ~1 hour to 277° C. and held at these conditions for 5 hours with removal of water via an attached fractionation column followed by a condenser. The pressure was reduced to 10 psig over 35 minutes before depressuring the Parr pressure reactor and discharging the reaction products, polyester oligomer. The polyester oligomer was off white but clear with no signs of undissolved TPA. The polyester oligomer was converted to polymer via conventional polymerization techniques.

The invention has been described in detail with particular reference to preferred embodiments thereof, but it will be understood that variations and modifications can be effected within the spirit and scope of the invention.

We claim:

1. A process for producing a polyester comprising the steps of:
   (a) obtaining an aqueous homogenous solution of isosorbide;
   (b) feeding the aqueous homogenous solution of step (a) into a reactor;
   (c) feeding one or more glycols and one or more dicarboxylic acids either into the aqueous solution of step (a) or into the reactor of step (b) either prior to, during and/or subsequent to step (b);
   (d) esterifying the reactor contents at sufficient temperatures and pressures, and optionally in the presence of suitable catalysts, to effect esterification;
   (e) forming a prepolymer; and
   (f) polycondensing the prepolymer at sufficient temperatures and pressures in the presence of a suitable catalyst to effect polycondensation to form a polyester.

2. The process of claim 1 wherein said aqueous homogenous solution of isosorbide is obtained by adding water to isosorbide monomer.

3. The process of claim 2 wherein 1 to 99% by weight of isosorbide is added to water further wherein the total percentage by weight of isosorbide and water equals 100% by weight.

4. The process of claim 3 wherein 60 to 95% by weight of isosorbide is added to water.

5. The process of claim 4 wherein 70 to 90% by weight of isosorbide is added to water.

6. The process of claim 1 wherein the aqueous solution of isosorbide consists essentially only of isosorbide and water and wherein said aqueous solution of isosorbide is fed into the reactor.

7. The process of claim 6 wherein water soluble additives and/or monomers other than isosorbide are added to the aqueous solution of isosorbide of step (a).

8. The process of claim 6 or 7 wherein non-water soluble additives and/or monomers are added to the aqueous solution of isosorbide of step (a).

9. The process of claim 1 wherein said polyester comprises about 0.25 to 50 mole % isosorbide wherein the total mole percentages of glycol in the polyester equal 100 mole %.

10. The process of claim 9 wherein said polyester comprises about 0.25 mole % to 30 mole % isosorbide.

11. The process of claim 10 wherein said polyester comprises about 20 to 30 mole % isosorbide.

12. The process of claim 10 wherein said polyester comprises about 1 to about 20 mole % isosorbide.

13. The process of claim 12 wherein said polyester comprises about 1 to about 8 mole % isosorbide.

14. The process of claim 1 wherein said polyester comprises isosorbide and one or more glycols selected from the group consisting of ethylene glycol, butylene glycol, propylene glycol, neopentyl glycol, and 1,4-cyclohexanedimethanol.

15. The process of claim 14 wherein said polyester comprises isosorbide and one or more glycols selected from the group consisting of ethylene glycol and 1,4-cyclohexanedimethanol.

16. The process of claim 1 wherein said polyester comprises one or more dicarboxylic acids selected from the group consisting of terephthalic acid, isophthalic acid, and naphthalenedicarboxylic acid.

17. The process of claim 16 wherein said polyester comprises one or more dicarboxylic acids selected from the group consisting of terephthalic acid and isophthalic acid.

18. The process of claim 17 wherein said polyester comprises terephthalic acid.

19. The process of claim 18 wherein said polyester further comprises isophthalic acid.

20. The process of claim 18 wherein said polyester comprises one or more dicarboxylic acids selected from the group consisting of terephthalic acid and isophthalic acid and one or more glycols, selected from the group consisting of isosorbide, 1,4-cyclohexanedimethanol and ethylene glycol.

21. The process of claim 20 wherein said polyester comprises 80 to 100 mole % terephthalic acid, 60 to 99.75 mole % ethylene glycol and 0.01 to 50 mole % isosorbide wherein the total mole percentages of the dicarboxylic acid component equals 100 mole % and the total mole percentages of the glycol component equals 100 mole %.

22. The process of claim 21 wherein said polyester comprises 0.25 to 40 mole % isosorbide.

23. The process of claim 22 wherein said polyester comprises 2 to 20 mole % isosorbide.

24. The process of claim 23 wherein said polyester comprises 2 to 10 mole % isosorbide.

25. The process of claim 21 wherein said polyester comprises 80 to 98 mole % ethylene glycol.

26. The process of claim 21 wherein said polyester comprises 90 to 98 mole % ethylene glycol.

27. The process of claim 21 wherein said polyester comprises 90 to 100 mole % terephthalic acid.

28. The process of claim 27 wherein said polyester comprises 0 to 10 mole % isophthalic acid.

29. The process of claim 20 wherein said polyester comprises 50 to 99.75 mole % 1,4-cyclohexanedimethanol, 80 to 100 mole % terephthalic acid, 0.25 to 50 mole % isosorbide, with the remainder of the glycol content, if any, comprises ethylene glycol wherein the total mole percentages of glycol equal a total of 100 mole % and wherein the total mole percentages of dicarboxylic acid equal a total of 100 mole %.

30. The process of claim 29 wherein said polyester comprises 1 to 40 mole % isosorbide.

31. The process of claim 30 wherein said polyester comprises 5 to 30 mole % isosorbide.

32. The process of claim 31 wherein said polyester comprises 90 to 100 mole % terephthalic acid.

33. The process of claim 29 wherein said polyester comprises isophthalic acid.

34. The process of claim 20 wherein said polyester comprises 50 to 99.75 mole % 1,4-cyclohexanedimethanol, 80 to 100 mole % terephthalic acid, 0.25 to 50 mole % isosorbide with the remainder of the glycol content, if any, comprises ethylene glycol wherein the total mole percentages of glycol equal a total of 100 mole % and wherein the total mole percentages of dicarboxylic acid equal a total of 100 mole %.

35. The process of claim 34 wherein said polyester comprises 5 to 30 mole % isosorbide.

36. The process of claim 35 wherein said polyester comprises 10 to 20 mole % isosorbide.

37. The process of claim 34 wherein said polyester comprises 90 to 100 mole % terephthalic acid.

38. The process of claim 37 wherein said polyester comprises isophthalic acid.

39. In a process for producing a polyester comprising repeat units from terephthalic acid residues and repeat units from isosorbide and one or more glycols selected from the group consisting of ethylene glycol residues and 1,4-cyclohexanedimethanol residues by esterification and/or transesterification followed by polycondensation, the improvement comprising the steps of:

(a) obtaining an aqueous homogenous solution of isosorbide;

(b) feeding the aqueous homogenous solution of step (a) into a reactor;

(c) feeding one or more glycols and one or more dicarboxylic acids either into the aqueous solution of step (a) or into the reactor of step (b) either prior to, during and/or subsequent to step (b);

(d) esterifying the reactor contents at sufficient temperatures and pressures, and optionally in the presence of suitable catalysts, to effect esterification;

(e) forming a prepolymer; and (f) polycondensing the prepolymer at sufficient temperatures and pressures in the presence of a suitable catalyst to effect polycondensation to form a polyester.

* * * * *